(12) United States Patent
Glucksman et al.

(10) Patent No.: US 9,265,371 B2
(45) Date of Patent: Feb. 23, 2016

(54) PORTABLE HEATING DEVICES FOR HOT BEVERAGE CONTAINERS HAVING INSULATING SLEEVES

(71) Applicant: Maverick Industries, Inc., Edison, NJ (US)

(72) Inventors: Dov Z. Glucksman, Danvers, MA (US); Laura J. Nickerson, Fitchburg, MA (US); Randall Soule, Reno, NV (US)

(73) Assignee: Maverick Industries, Inc., Edison, NJ (US)

( * ) Notice: Subject to any disclaimer, the term of this patent is extended or adjusted under 35 U.S.C. 154(b) by 0 days.

(21) Appl. No.: 14/549,743

(22) Filed: Nov. 21, 2014

(65) Prior Publication Data

US 2015/0096972 A1    Apr. 9, 2015

Related U.S. Application Data

(63) Continuation-in-part of application No. 13/947,279, filed on Jul. 22, 2013, which is a continuation-in-part of application No. 13/317,724, filed on Oct. 25, 2011, now abandoned.

(51) Int. Cl.
| | |
|---|---|
| *H05B 3/68* | (2006.01) |
| *F27D 11/00* | (2006.01) |
| *A47G 19/22* | (2006.01) |
| *A47J 36/24* | (2006.01) |

(52) U.S. Cl.
CPC ......... *A47G 19/2288* (2013.01); *A47J 36/2461* (2013.01)

(58) Field of Classification Search
CPC ............. A47G 19/2288; A47J 36/2461; A47J 36/2411; A47J 36/2433; A47J 36/2444; A47J 27/082

USPC .......................................... 219/429–442, 518
See application file for complete search history.

(56) References Cited

U.S. PATENT DOCUMENTS

| | | | |
|---|---|---|---|
| 1,414,494 A | 5/1922 | Amtfield | |
| 2,419,416 A | 4/1947 | Mustain | |
| 2,516,637 A | 7/1950 | McCollum | |
| 2,863,037 A | 12/1958 | Johnstone | |
| 3,375,774 A * | 4/1968 | Fujimura et al. | ................ 99/281 |
| 3,798,418 A * | 3/1974 | Reik | ........................ B01L 7/00 219/433 |
| 4,095,090 A | 6/1978 | Pianezza | |
| 4,463,664 A | 8/1984 | Peace | |
| 4,801,782 A | 1/1989 | Ineson | |
| 5,208,896 A | 5/1993 | Katayev | |

(Continued)

*Primary Examiner* — Sang Y Paik
(74) *Attorney, Agent, or Firm* — Doherty IP Law Group LLC

(57) ABSTRACT

An apparatus for heating hot beverage containers includes a housing having an upper end, a lower end, and a sidewall extending between the upper and lower ends of the housing. The upper end of the sidewall has oppositely disposed, downwardly curving portions that define oppositely disposed openings at the upper end of said housing. The apparatus includes a heater assembly located at the lower end of the housing. The apparatus has a controller including an electrical circuit in communication with the heater assembly, and a switch located on the sidewall of the housing for activating the heater assembly. A hot beverage container with an insulating sleeve is inserted into the housing. A sidewall of the container engages the switch and a bottom wall of the container is in thermal communication with the heater assembly. The heater assembly heats liquid in the container through the bottom wall of the container.

21 Claims, 16 Drawing Sheets

(56) References Cited

U.S. PATENT DOCUMENTS

| | | |
|---|---|---|
| 5,283,420 A | 2/1994 | Montalto |
| 5,508,494 A | 4/1996 | Sarris et al. |
| D379,738 S | 6/1997 | Liming et al. |
| D386,948 S | 12/1997 | Wissinger |
| 5,823,095 A * | 10/1998 | Walker .......................... 99/281 |
| 6,037,570 A | 3/2000 | Noles |
| 6,072,161 A | 6/2000 | Stein |
| 6,075,229 A | 6/2000 | Vanselow |
| 6,121,585 A | 9/2000 | Dam |
| 6,140,614 A | 10/2000 | Padamsee |
| 6,192,787 B1 | 2/2001 | Montalto |
| 6,403,928 B1 | 6/2002 | Ford |
| 6,511,031 B2 | 1/2003 | Lin |
| D473,104 S | 4/2003 | Salesman-Loken et al. |
| 6,674,052 B1 | 1/2004 | Luo |
| 6,703,590 B1 | 3/2004 | Holley, Jr. |
| 6,840,159 B1 * | 1/2005 | Li .................................. 99/337 |
| 6,852,954 B1 | 2/2005 | Liu et al. |
| 6,864,462 B2 | 3/2005 | Sanoner et al. |
| 6,870,135 B2 | 3/2005 | Hamm et al. |
| 7,022,946 B2 | 4/2006 | Sanoner et al. |
| 7,291,812 B2 * | 11/2007 | Kaney et al. .................. 219/435 |
| D570,159 S | 6/2008 | McGill |
| D658,922 S | 5/2012 | Fallon et al. |
| 8,274,016 B2 | 9/2012 | Montana |
| D687,254 S | 8/2013 | Soule |
| 2002/0023912 A1 | 2/2002 | McGee et al. |
| 2002/0175158 A1 | 11/2002 | Sanoner et al. |
| 2004/0140304 A1 | 7/2004 | Leyendecker |
| 2005/0016985 A1 * | 1/2005 | Haas et al. .................... 219/438 |
| 2006/0186297 A1 | 8/2006 | Lore, Sr. |
| 2009/0038317 A1 | 2/2009 | Otey |
| 2010/0089901 A1 | 4/2010 | Montana |
| 2013/0098893 A1 | 4/2013 | Soule |
| 2013/0306617 A1 | 11/2013 | Soule |

* cited by examiner

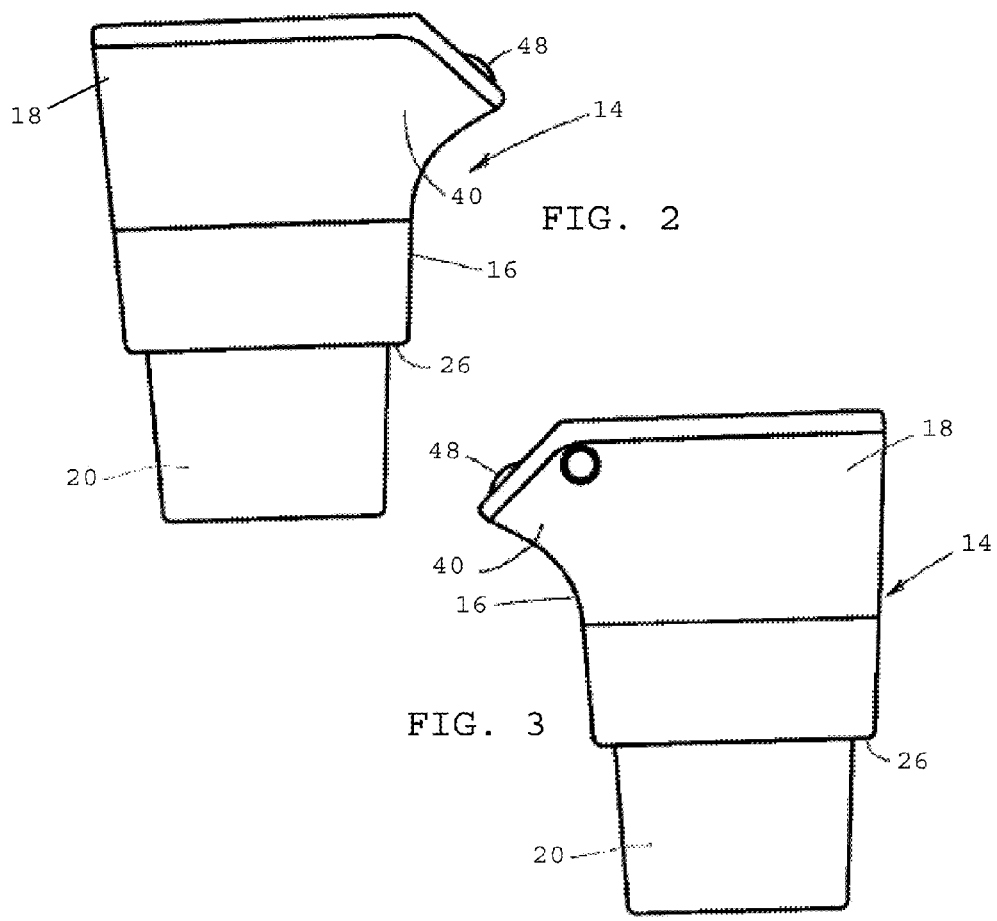

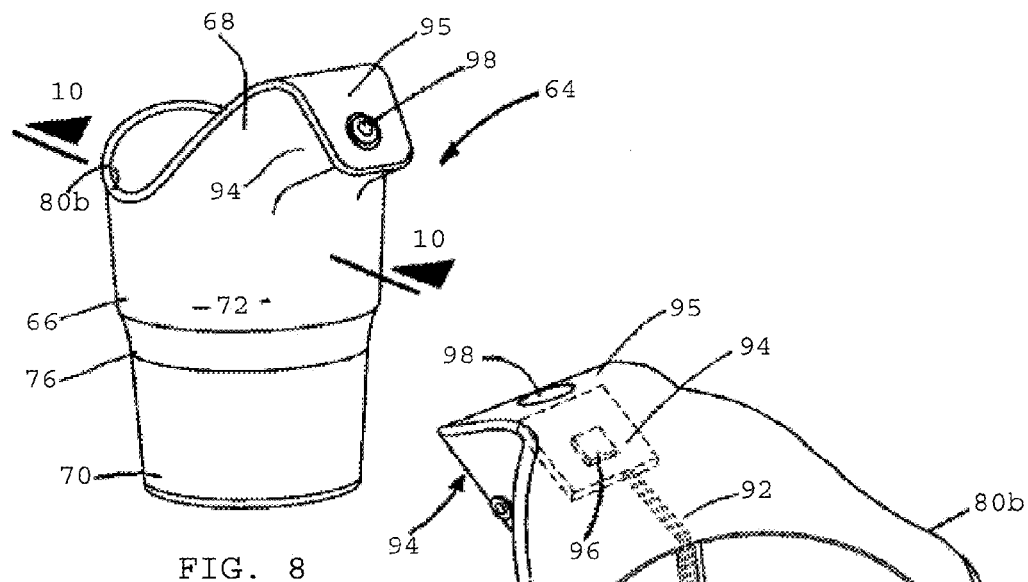
FIG. 8
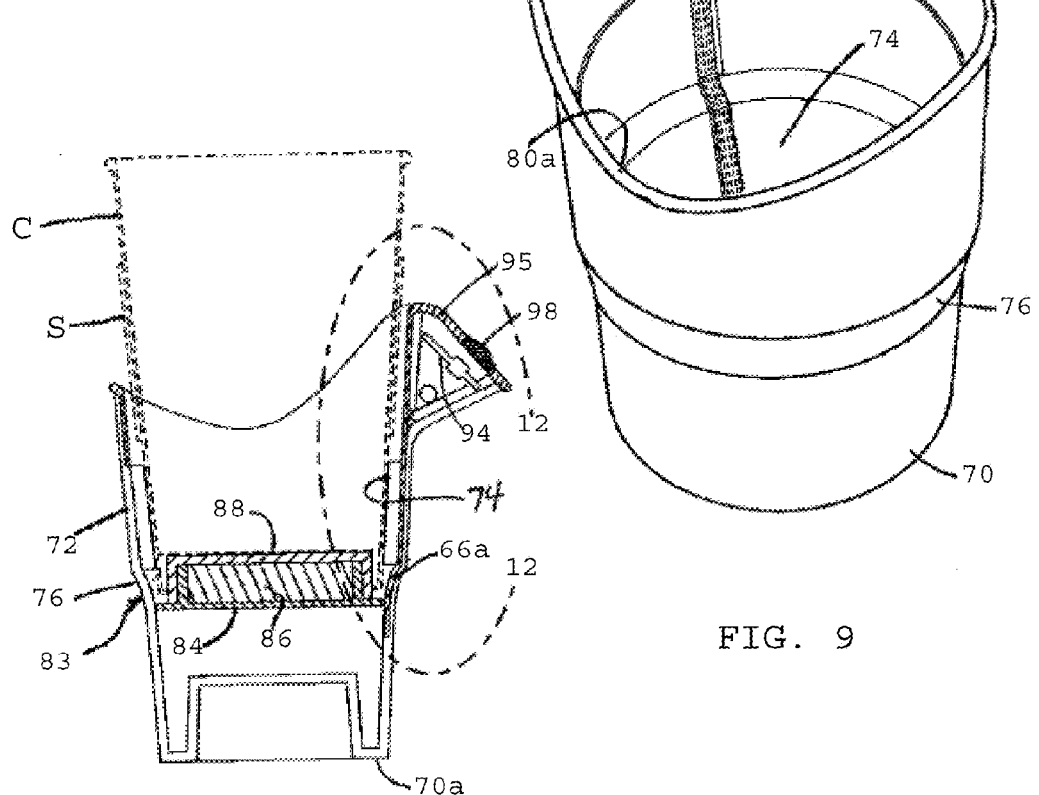
FIG. 9
FIG. 10

PORTABLE HEATING DEVICES FOR HOT BEVERAGE CONTAINERS HAVING INSULATING SLEEVES

CROSS-REFERENCE TO RELATED APPLICATIONS

The present application is a continuation-in-part of U.S. patent application Ser. No. 13/947,279, filed Jul. 22, 2013, published as US 2013/0306617, which is a continuation-in-part of U.S. patent application Ser. No. 13/317,724, filed Oct. 25, 2011, published as US 2013/0306617, the disclosures of which are hereby incorporated by reference herein.

BACKGROUND OF THE INVENTION

1. Field of the Invention

The present application is directed to heating beverage, and is more specifically related to heating devices for hot beverage containers having insulating sleeves.

2. Description of the Related Art

Beverages such as coffee, tea and the like are best enjoyed when consumed hot. When such beverages are served in a conventional drinking cup they tend to cool relatively rapidly. This is particularly true when the beverage is served in a paper drinking cup of the character used in many drive-through restaurants.

Devices of several different designs have been suggested in the past for warming consumable liquids and for maintaining the elevated temperature of the liquid. Exemplary of one such device is that described in U.S. Pat. No. 6,121,585 to Dam. The invention described in the Dam patent comprises a beverage cup and cup holder system. The Dam beverage cup includes a sleeve, a liner and a base that includes a plate, a heating element and a pair of spring terminals. The base further includes a contact ring and a contact disk. The cup holder, which is adapted to mate with the base of the beverage cup, has recessed land areas which lie below a plane of the support for the beverage cup and are electrically isolated from each other. The cup holder includes spring contacts which extend into the recessed land areas and are adapted to receive connections from an external source of electrical current. The beverage cup, when filled with a hot beverage, is placed into the cup holder. As the beverage cup is placed into the cup holder, the contact disk and contact ring automatically align with the recessed land areas and make contact with the spring contacts. The heating element of the device maintains a beverage at a desirable equilibrium temperature for an extended period of time.

Another prior art device past for warming consumable liquids is described in U.S. Pat. No. 4,463,664 issued to Peace. The Peace invention provides a receptacle having a thermally nonconductive exterior to retain the heat of liquids, and a durable heat-conductive interior portion to reside in heat-conductive relation with a source of warming heat, so as to impart heat to the contents of the receptacle. The receptacle of the Peace device comprises a heat-conductive liner including a bottom portion and an upwardly extending wall portion, and a heat-insulating sleeve surrounding the wall portion of the liner, the bottom portion of the liner being exposed for direct contact with a heat source. The nonconductive sleeve surrounding the wall portion of the conductive liner has an open bottom which terminates a short distance below the bottom portion of the liner in surrounding yet spaced-apart relation to the bottom portion, in order to isolate the sleeve from the heat source.

U.S. Pat. No. 8,274,016 to Montana discloses a cup holder having a heating surface that is configured to receive a cardboard cup. The cup holder has an outside surface that is concentric with the heating surface. A heating element is disposed between the heating surface and the outside surface, and the heating element is configured to heat the heating surface. Insulation is located between the heating surface and the outside surface, and the insulation may be configured to maintain the outside surface at an outside temperature lower than a heating temperature of the heating surface. The cup holder has a pressure-sensitive switch located in a bottom portion of the heating surface. The pressure sensitive switch allows a current to run through the heating element in response to the cardboard cup exerting pressure on the pressure-sensitive switch. Although an advance, Montana does not discloses an effective system for heating a cardboard cup having an insulating sleeve. Moreover, Montana does not disclose a system for heating a beverage through the bottom wall of a cardboard cup because the pressure sensitive switch disclosed in Montana is located at the bottom of the cup holder wherein it is engaged by the bottom wall of a cardboard cup inserted into the cup holder.

Thus, there remains a need for portable heating devices for hot beverage containers such as paper cups having insulating sleeves. There also remains a need for heating devices that are designed for receiving paper cups having insulating sleeves. There also remains a need for heating devices that heat liquids through the bottom wall of a paper cup.

SUMMARY OF THE INVENTION

By way of brief summary, one form of the apparatus of the present invention for warming consumable liquids and for controllably maintaining the elevated temperature of the liquid comprises a housing having a tapered upper portion, a tapered lower portion and a side wall defining a tapered receiving chamber for receiving the container containing the consumable liquid. Disposed within the housing in close proximity to the tapered receiving chamber is an electric heater for heating the receiving chamber. Operably associated with the electric heater is a controller that includes an electrical circuit for energizing said electric heater and for controllably maintaining the electric heater at a selected one of a plurality of elevated temperatures.

With the foregoing in mind, it is an object of the present invention to provide an apparatus for warming consumable liquids and for maintaining the elevated temperature of the liquid that uniquely includes a heating mechanism that will maintain the temperature of the liquid at one of three temperatures selected by the user.

Another object of the invention is to provide an apparatus of the aforementioned character which will consistently maintain hot drinks at the desired elevated temperature when a user is traveling in a vehicle or is at any location where there is a 12 VDC or 120 VAC power source.

Another object of the invention is to provide an apparatus of the character described in which the tapered receiving chamber of the device will receive paper take-out containers of virtually every size including coated containers and will effectively hold the container in a stable, readily accessible position.

Another object of the invention is to provide an apparatus of the class described which is designed and sized to allow the user to remove the container from the tapered receiving chamber of the device in order to drink the consumable liquid, or alternatively, to leave the container in the tapered receiving chamber and drink the consumable liquid while holding the device with the container still positioned within the tapered receiving chamber.

Another object of the invention is to provide an apparatus of the character described in the preceding paragraphs which is designed and constructed in a manner that makes it fully compliant with Underwriter Laboratories (UL), ETL Testing Laboratories (now Intertek Testing Services) (ETL) and like nationally recognized testing laboratories approval requirements.

Another object of the invention is to provide an apparatus of the aforementioned character in which, for safety purposes, the controller of the device will de-energize the electric heater after the electric heater reaches a predetermined elevated temperature.

Another object of the invention is provide an apparatus of the character described in which the controller of the device will de-energize said electric heater after the expiration of a predetermined time following the energization of the heater.

Another object of the invention is provide an apparatus of the character described in which the device has three preset temperature settings of low, medium and high and in which the device housing is provided with three small "coffee bean" shaped lights which indicate the temperature setting selected.

Still another object of the invention is to provide an alternate form of the apparatus of the invention for warming a consumable liquid that is contained within a disposable, conventionally configured paper cup and for maintaining the elevated temperature of the liquid contained within the paper cup.

Another object of the invention is to provide an alternate form of the apparatus of the invention as described in the preceding paragraph that is specially designed to permit the apparatus to be easily used with a disposable paper cup about which a heating insulating sleeve has been placed. More particularly, in the design of the alternate form of the apparatus of the invention, a portion of both of the side walls of the unit has been removed to permit the disposable paper cup along with a heat insulating sleeve to be easily inserted into and removed from the tapered receiving chamber of the unit.

Another object of the invention is provide an apparatus of the character described that is attractive in appearance, is inexpensive to manufacture and is easy to use.

In one embodiment, an apparatus for heating hot beverage containers, such as paper cups having insulating sleeves, preferably includes a housing having an upper end, a lower end, and a sidewall extending between the upper and lower ends of the housing. An upper end of the sidewall has oppositely disposed, downwardly curving portions that define oppositely disposed openings at the upper end of the housing. Although the present invention is not limited by any particular theory of operation, it is believed that the oppositely disposed openings facilitate the insertion and removal of containers having insulating sleeves due to the fact that the insulating sleeves are accessible for engagement through the oppositely disposed openings.

In one embodiment, the apparatus desirably includes a heater assembly disposed inside the housing, which is located at the lower end of the housing. In one embodiment, the heater assembly is located at the bottom of the housing and the sidewall of the housing surrounds and is spaced from the outer perimeter of the heater assembly. In one embodiment, when a hot beverage container is inserted into the housing, the bottom wall of the container sits atop the heater assembly and the bottom rim of the container extends between the outer perimeter of the heater assembly and the sidewall of the housing. In one embodiment, the apparatus desirably has a controller including an electrical circuit in communication with the heater assembly, and a switch located on the sidewall of the housing and being in communication with the controller for activating the heater assembly when a hot beverage container is inserted into the housing.

In one embodiment, a hot beverage container has a bottom wall defining a closed end of the container and a sidewall extending between upper and lower ends of the hot beverage container. A lower end of the sidewall preferably defines a bottom rim of the hot beverage container, which extends below the bottom wall of the hot beverage container. An insulating sleeve preferably overlies the sidewall of the hot beverage container. The insulating sleeve is desirably removable from the container. In one embodiment, the container is a paper cup and the insulating sleeve is made of paper. In one embodiment, when the hot beverage container is inserted into the housing, a sidewall of the hot beverage container engages the switch on the sidewall of the housing for activating the heat assembly.

In one embodiment, the heater assembly desirably includes a heater frame secured inside the housing at the bottom of the housing, an electric heater element supported by the heater frame and being in communication with the controller, and a heater cover overlying the electric heater element. The heater cover desirably has a top surface facing toward the open, upper end of the housing. In one embodiment, when the hot beverage container is inserted into the housing, the bottom wall of the hot beverage container directly engages the top surface of the heater cover for heating liquid contained within the hot beverage container. The bottom wall of the container is desirably in direct contact with the entire surface of the heater cover for providing optimum thermal conductivity between the heater cover and a liquid held by the container. The heat generated by the heater assembly preferably passes through the bottom wall of the container for heating the liquid held by the container.

In one embodiment, when the hot beverage container is inserted into the housing, the bottom wall of the hot beverage container directly engages the top surface of the heater cover, and the bottom rim of the hot beverage container surrounds an outer perimeter of the heater cover. In one embodiment, the bottom wall of the hot beverage container directly engages the top surface of the heater cover, and the bottom rim of the hot beverage container extends between the outer perimeter of the heater cover and the sidewall of the housing. The interaction between the bottom rim of the container and the outer perimeter of the heater cover desirably functions to self-center the bottom wall of the container over the heater cover.

In one embodiment, when the hot beverage container is inserted into the housing, the insulating sleeve extends above the oppositely disposed openings in the sidewall of the housing for being accessible through the oppositely disposed openings. As a result, a user, when grasping the insulating sleeve, may easily insert the hot beverage container into the housing and/or remove the hot beverage container from the housing. Although the present invention is not limited by any particular theory of operation, it is believed that prior are cup holders are not designed to receive cups having insulating sleeves.

In one embodiment, the upper end of the housing desirably includes a protuberance defining a chamber. The electrical circuit for the controller is preferably disposed within the chamber. The apparatus may include an ON/OFF switch accessible outside the housing, whereby the ON/OFF switch is in communication with the electrical circuit. In one embodiment, the ON/OFF switch is illuminated to indicate that power has been turned on. The ON/OFF switch goes dark when power has been turned off. In one embodiment, the ON/OFF switch may be located on the protuberance at the upper end of the housing.

In one embodiment, the apparatus desirably includes a spring element disposed inside the housing, and which is located on an inner surface of the sidewall of the housing. Inside the housing, the spring element preferably opposes the switch so that when a container is inserted into the housing, the spring engages a first side of the container for urging an opposite, second side of the container against the switch.

In one embodiment, an apparatus for heating a hot beverage container holding liquid desirably includes a housing having an upper end, a lower end, and a sidewall extending between the upper and lower ends of the housing, whereby an upper end of the sidewall has oppositely disposed, downwardly curving portions that define oppositely disposed openings at the upper end of the housing. The apparatus preferably has a heater assembly located at the lower end of the housing, whereby the sidewall of the housing surrounds the heater assembly. The apparatus preferably has a controller including an electrical circuit in communication with the heater assembly for energizing the heater assembly, and a switch located on the sidewall of the housing, which is in communication with the controller. In one embodiment, a hot beverage container has a bottom wall and a sidewall extending upwardly from the bottom wall, whereby the sidewall of the hot beverage container extends below the bottom wall of the hot beverage container to define a bottom rim of the hot beverage container. An insulating sleeve preferably overlies the sidewall of the hot beverage container. In one embodiment, when the hot beverage container is inserted into the housing, the sidewall of the hot beverage container engages the switch for activating the heater assembly. When inserted into the housing, the bottom wall of the hot beverage container is desirably in thermal communication with the heater assembly.

In one embodiment, the heater assembly preferably includes a heater frame disposed inside the housing and overlying a bottom wall of the housing, an electric heater element supported by the heater frame and being in communication with the controller, and a heater cover overlying the electric heater element. The heater cover desirably has a top surface, such as a horizontally-extending flat surface, facing toward the upper end of the housing. The bottom wall of the hot beverage container directly engages the top surface of the heater cover for heating liquid held by the hot beverage container.

These and other preferred embodiments of the present invention will be described in more detail below.

BRIEF DESCRIPTION OF THE DRAWING

FIG. 2 is a right side view of the apparatus shown in FIG. 1.

FIG. 3 is a left side view of the apparatus shown in FIG. 1.

FIG. 8 is a generally perspective, front view of an alternate form of the apparatus of the invention for warming consumable liquids.

FIG. 9 is a generally perspective, rear view of the alternate form of the apparatus of the invention shown in FIG. 8.

FIG. 10 is a cross-sectional view taken along lines 10-10 of FIG. 8.

DETAILED DESCRIPTION

Figure 1:
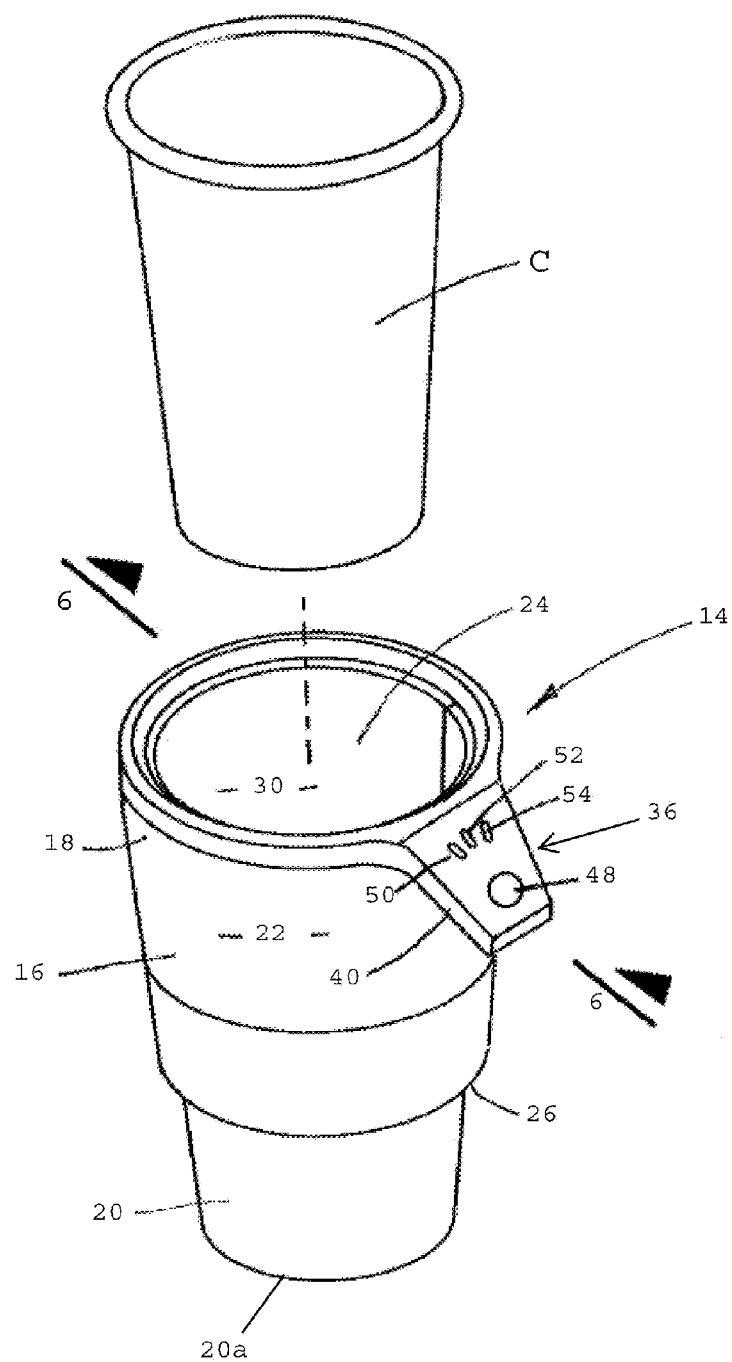
FIG. 1 is a generally perspective, exploded view of one form of the apparatus of the invention for warming consumable liquids and for maintaining the elevated temperature of the liquid.

Referring to the drawings and particularly to FIGS. 1 through 4, one form of the apparatus of the invention for warming consumable liquids and for maintaining the elevated temperature of the liquid is there shown and generally designated by the numeral 14. The apparatus here comprises a housing 16 having an upper portion 18, a tapered lower portion 20, a side wall 22 defining a tapered receiving chamber 24 for receiving the container "C" and a shoulder 26 disposed between upper and lower portions 18 and 20. When the apparatus is in use, shoulder 26 engages a receptacle, such as a vehicle cup holder, so as to hold the apparatus in a stable, upright position. Lower portion 20 includes a generally planar surface 20a that permits the apparatus to rest in a stable fashion on a table, desk top and the like (See FIG. 5).

Figure 4:
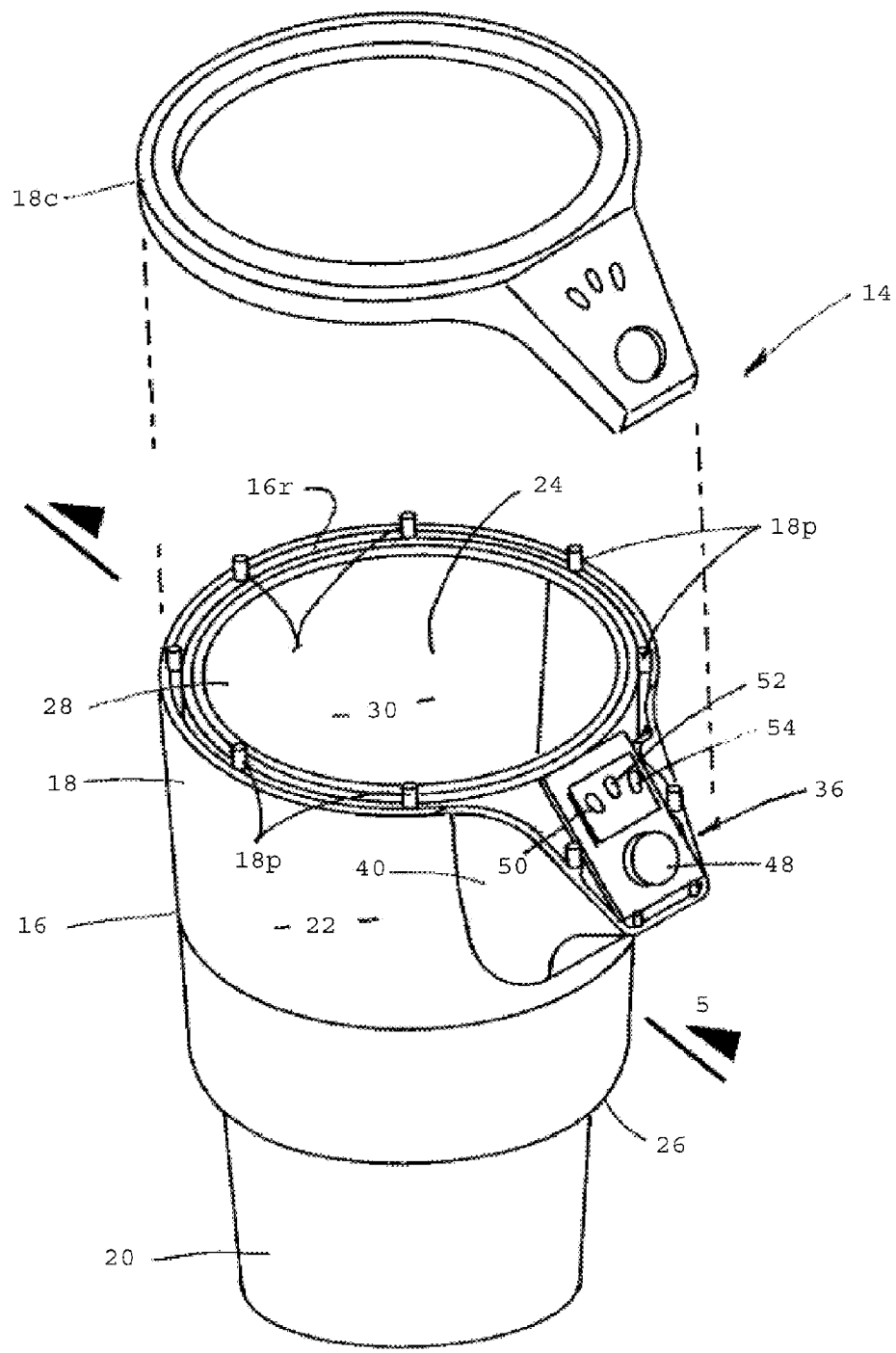
FIG. 4 is a generally perspective, exploded view of the apparatus of the invention illustrating the positioning of the controller assembly of the apparatus on the device housing.
Figure 5:
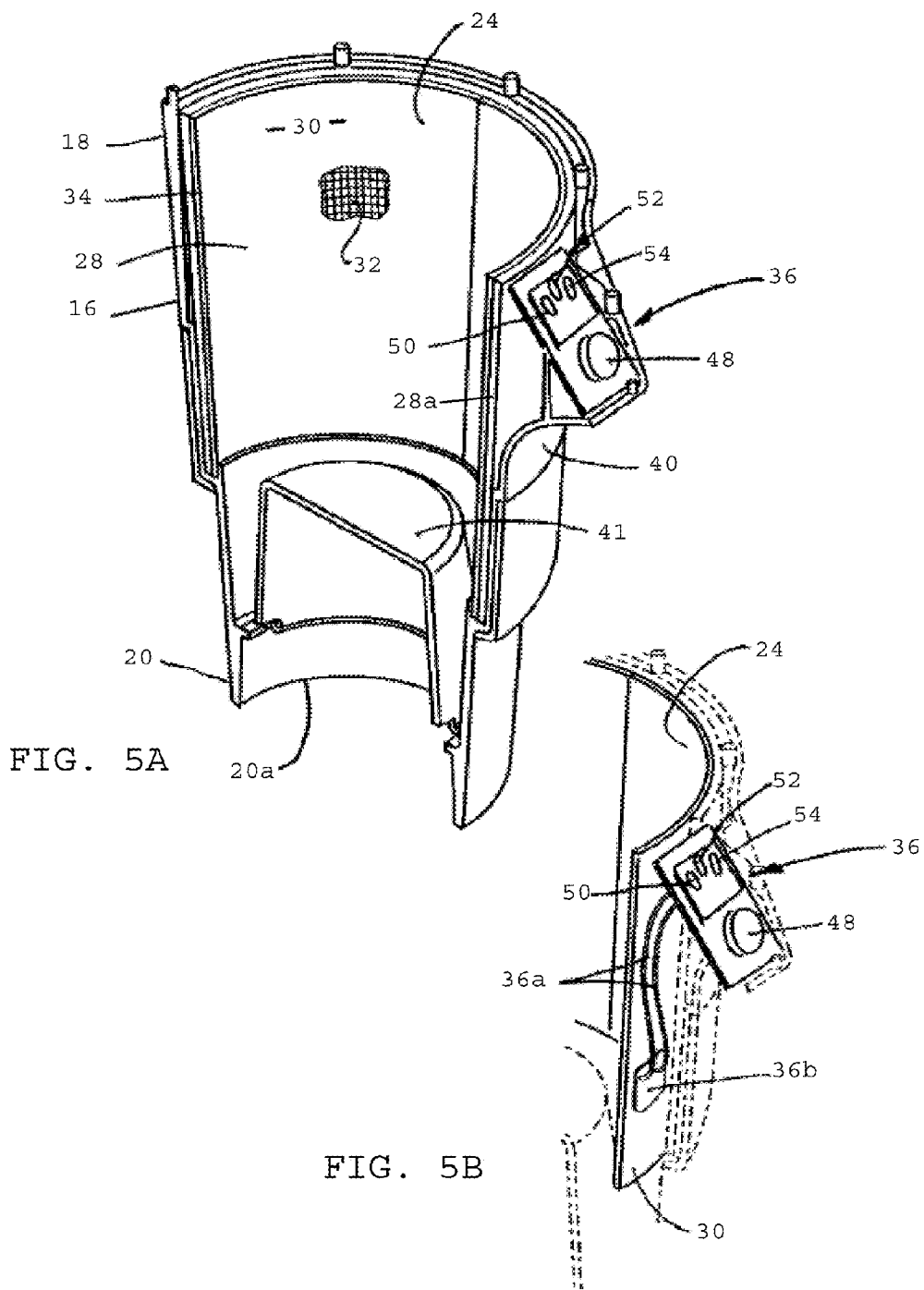
FIG. 5A is a cross-sectional view taken along lines 5-5 of FIG. 4.
FIG. 5B is a generally perspective, fragmentary view of the apparatus shown in FIG. 5A illustrating the interconnection of the controller with the heating member.
Figure 6:
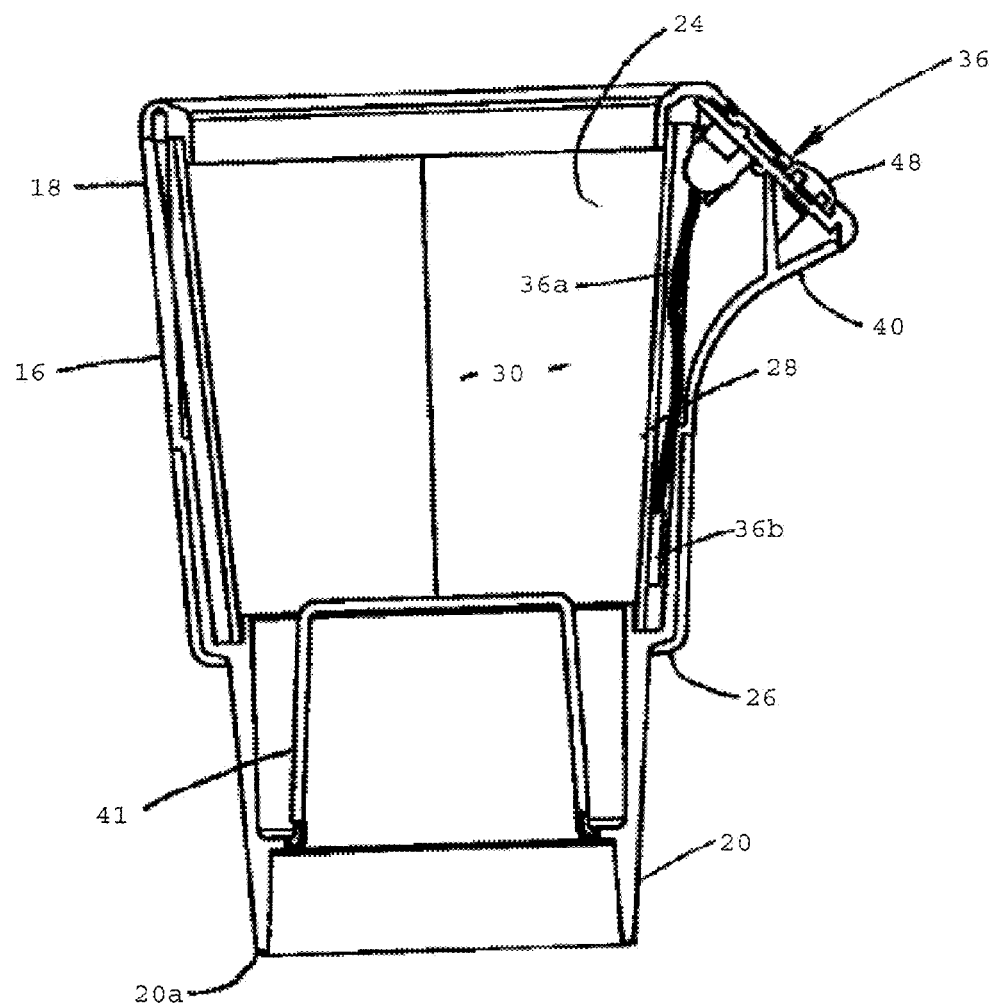
FIG. 6 is a cross-sectional view taken along lines 6-6 of FIG. 1.

Referring to FIG. 4, upper portion 18 includes a cover 18c that is aligned with and affixed to the housing rim 16r by means of a plurality of circumferentially spaced, upwardly extending pins 18p that are closely received within a plurality of apertures (not shown) formed in the cover 18c.

Referring to FIG. 5A, carried by housing 16 for controllably heating receiving chamber 24 is a specially designed electric heater assembly 28, which here comprises a generally conical shaped, flexible resistive heater member 30 that is carried by housing 16 in close proximity to tapered receiving chamber 24. Heater member 30 here comprises a silicone encapsulated wire-wound heating element 32. The silicone rubber encapsulation 34 is very flexible yet provides a watertight environmental seal. The electric heater comprises a generally conical shaped member carried by said housing and disposed proximate said tapered receiving chamber, said generally conical shaped member having a heating element embedded there within. Heater assembly 28 includes an insulating member 28a that is affixed to the outer surface of the heater member 30. Insulating member 28a here comprises a sponge rubber insulation that is formed to conform to the outer surface of the heater member.

Forming an important feature of the present invention is the controller 36 that is operably associated with the electric heater for energizing the electric heater and for selectively heating the electric heater to a selected elevated temperature and for maintaining the electric heater at the selected temperature. More particularly, controller 36 is interconnected with the electric heater in a conventional manner by means of a pair of connector wires 36a and a connector terminal 36b (FIG. 5B). Controller 36 comprises an electrical circuit 38 (FIG. 7) the character of which will presently be described. As best seen in FIG. 4, the upper portion 18 of housing 16 includes a protuberance 40 upon which the electrical circuit 38 of the controller 36 is mounted. The lower portion 20 of housing 16 includes a generally cup-shaped support 41 for supporting the container "C" that is mounted internally of a chamber 20a formed in the lower portion 20.

Figure 7:
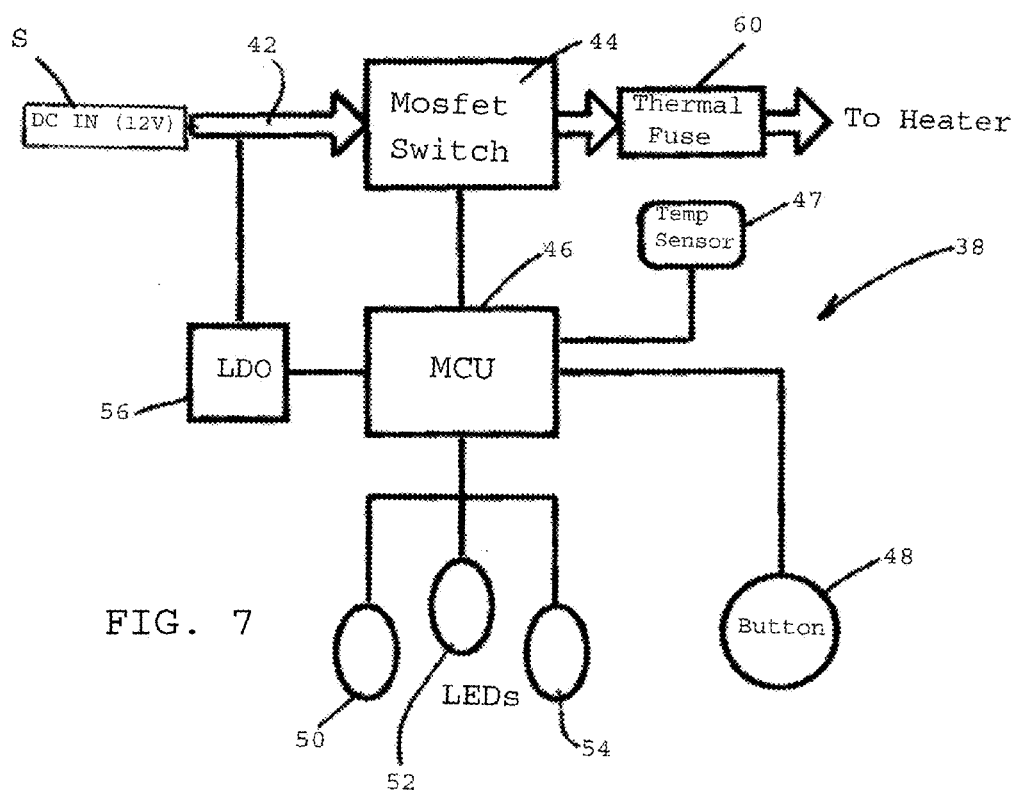
FIG. 7 is a block diagram of the electrical circuitry of one form of the apparatus of the invention.

Referring particularly to FIG. 7, one form of the electrical circuitry 38 is there shown. As indicated in FIG. 7, the portable liquid warmer or coffee cup warmer of the invention is designed to operate from a 12 VDC source "S", such as a cigarette lighter, or from a 120 VAC to 12 VDC adapter. For this purpose, the circuit includes a connector 42 for connecting the electrical circuit 38 to the twelve-volt power source "S".

The DC IN, or source "S" feeds to a readily commercially available metal-oxide-semiconductor field-effect transistor (MOSFET) switch 44 of a character well understood by those skilled in the art that consists of a pair of N-Channel MOSFETs in parallel as a low-side power switch. The transistor switch controls the DC power passing from the input to the heater element while a thermistor assembled in the heater assembly 28 is monitored to determine the actual temperature. The transistors are driven with a logic level signal (e.g. 3.3 Volt) to reduce system complexity. Two transistors are used in parallel to reduce power dissipation which can be more of a problem with low gate voltage drive. The MOSFET switch 44 is available from various sources, but a MOSFET switch offered for sale by Texas Instruments of Dallas, Tex. has proven satisfactory for the present purpose.

The MOSFET switch 44 communicates with a microcontroller (MCU) 46 that provides the control and measurement features necessary to operate the device. The microcontroller 46 sequences the control signals, measures the temperature via a temperature sensor 47 and provides the user interface controls for a control button 48 and three LED indicators 50, 52 and 54. A small linear low dropout (LDO) voltage regulator 56 provides the operating power for the MCU and LEDs.

In the apparatus of the present form of the invention, the MCU 46 performs two primary control functions. The first of these is the user interface control which processes button presses by the user to select the various operating modes. The second control function is the temperature measurement and heater control function. This also includes an automatic power-down feature to de-energize the electric heater after a predetermined period of time. The MCU here includes a 16-bit analog to digital converter (ADC) for measurement of the thermistor-controlled voltage (temperature).

As depicted in FIG. 1, the LED's 50, 52 and 54, each of which is covered by a lens is in the shape of a coffee bean, are readily commercially available from sources such as the Kingbright Corporation of City Of Industry, Calif. The LED's function to indicate which setting is active on the cup warmer. The LED's and control button 48 are directly interfaced to the MCU and the user interface is implemented in software which executes on the MCU in a manner well understood by those skilled in the art. In the present form of the invention, LED 50 indicates the low setting while LED's 52 and 54 indicate medium and high settings, respectively. The temperature settings can be preset at any desired levels, but here are set at 125, 140 and 155 degrees Fahrenheit respectively. Sequentially pressing the control button 48 indexes the system through four modes, namely off, low heat, medium heat and high heat.

A timer disposed internally of the MCU 46 provides a periodic measurement and control update function as well as an automatic power-off timer. MCU 46, which is of a character well understood by those skilled in the art, is available from various sources, but an MCU offered by Texas Instruments under the serial number MSP430 has proven satisfactory for the present purpose.

As previously mentioned, temperature is measured at the outside of the flexible heater using the temperature sensor 47. The microcontroller compares the measured voltage to set-point operating levels to determine whether the device temperature is at the proper value. The temperature sensor is available from various sources, but a sensor offered by the Cantherm Company of Montreal, Canada has proven satisfactory.

As previously mentioned, controller 36 functions to de-energize the electric heater after it reaches a predetermined elevated temperature. For this purpose, a thermal fuse 60 is assembled in series with the flexible heater of the apparatus and is placed in contact with the heater. The thermal fuse 60 is designed to open the circuit and force the heater off should the temperature ever exceed about 183° F. (84° C.). In order to prevent melting of the plastic or combustion of internal parts of the device, fuse 60 cannot be reset and must be replaced should the over-temperature condition ever occur. Thermal fuses of various temperatures are readily commercially available and the optimal safety temperature is selected to match the particular design materials and safety requirements.

For additional safety, the controller circuit also includes the previously mentioned internal timer that provides an automatic shutoff feature that functions to de-energize the heater after the expiration of a predetermined time as, for example, approximately 30 minutes. The shutoff timer may be reset by simply pressing the control button to start another cycle.

In using the apparatus of the invention, the user first inserts the container "C" containing the consumable liquid, such as a tapered paper cup, into the tapered receiving chamber 24. In this regard, as previously mentioned, the tapered receiving chamber 24 accepts all standard cup sizes and performs equally well with various other cup sizes. With the device connected to a suitable 12 VDC or 120 VAC power source, the control button 48 is pushed to activate the device. This will cause the electric heater to heat to the low temperature of about 125 degrees Fahrenheit and will cause LED 50 to illuminate indicating that the low temperature setting has been selected. A second pushing of the control button 48 will cause the electric heater to heat to the medium temperature of about 140 degrees Fahrenheit and will cause LED 52 to illuminate indicating that the medium temperature setting has been selected.

A third pushing of the control button 48 will cause the electric heater to heat to the high temperature of about 155 degrees Fahrenheit and will cause LED 54 to illuminate indicating that the high temperature setting has been selected. A fourth pushing of the control button 48 will inactivate the device so that a new cycle can be started at the convenience of the user.

Following activation of the device, if the temperature rises above the programmed temperature settings (Low/Medium/High), the unit will automatically shut off and will reactivate once as the temperature reaches the specified level. Similarly, following activation of the device, the device will automatically deactivate after 30 minutes have expired. To reactivate the device, the user need only push the control button 48

Referring next to FIGS. 8 through 13B, an alternate form of the apparatus of the invention for warming consumable liquids and for maintaining the elevated temperature of the liquid is there shown and generally designated by the numeral 64. This apparatus is similar in some respects to the apparatus illustrated in FIGS. 1 through 7. However, as will be discussed in greater detail in the paragraphs which follow, the apparatus of this latest form of the invention is specially designed to permit the apparatus to be easily used with a disposable paper cup about which a heat insulating, corrugated protective sleeve has been placed. More particularly, in the design of the alternate form of the apparatus of the invention, a portion of both of the side walls of the unit has been removed to permit the disposable paper cup along with a heat protective sleeve to be easily inserted into and removed from the tapered receiving chamber of the unit.

Figure 11:
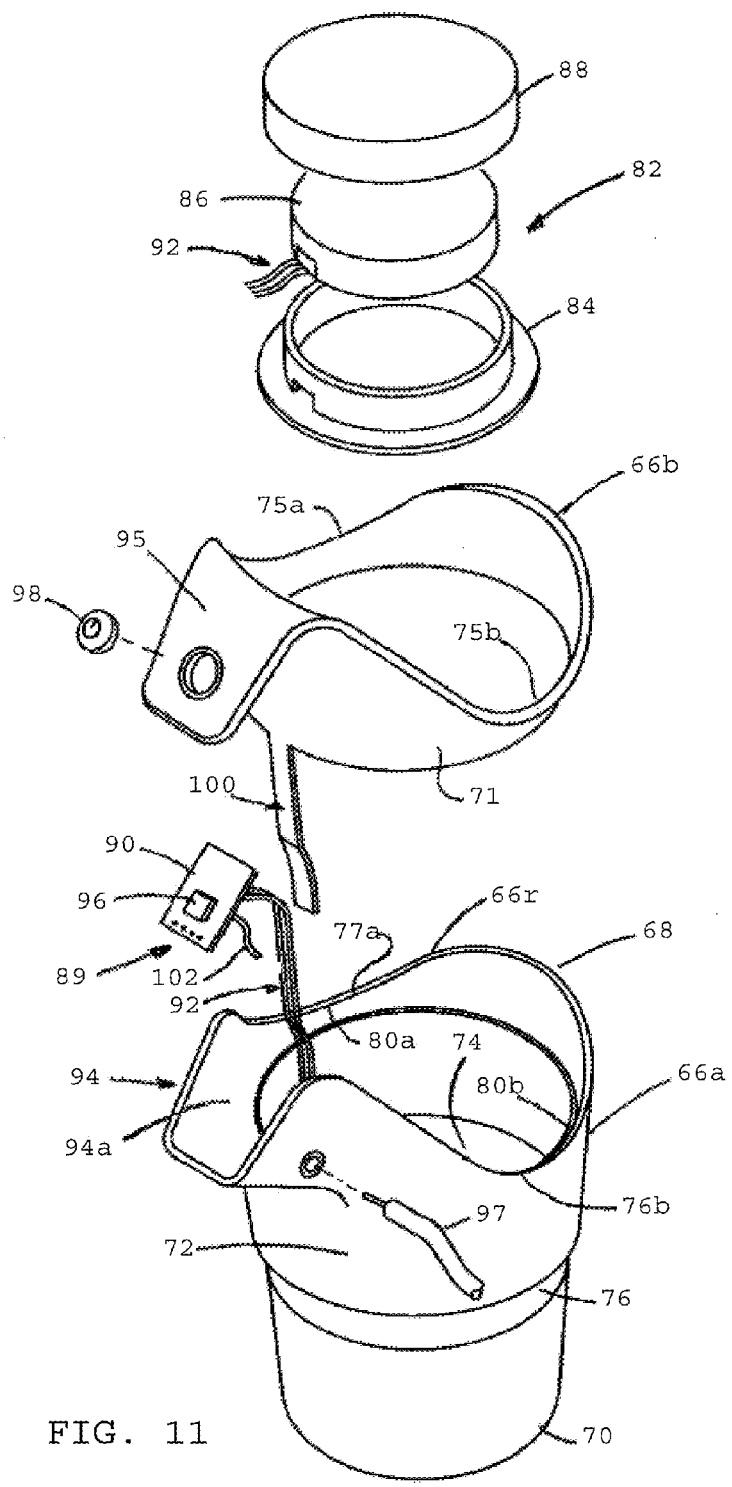
FIG. 11 is a generally perspective, exploded view of the alternate form of the apparatus of the invention.

As best seen by referring to FIGS. 9 and 11 of the drawings, this latest form of the invention comprises a somewhat differently configured, two-part housing 66 having a lower cup housing portion 66a and a tapered upper cover portion 66b. Lower cup housing portion 66a includes an upper portion 68, a lower portion 70 and a side wall 72 defining a tapered receiving chamber 74 for receiving the container "C". Disposed between upper and lower portions 68 and 70 is a tapered shoulder portion 76 that is adapted to engage a receptacle, such as a vehicle cup holder (not shown), so as to hold the apparatus in a stable, upright position. Lower portion 70 includes a generally annular shaped, planar surface 70a that permits the apparatus to rest in a stable fashion on a flat surface, such as a table, desk top and the like (See FIG. 10). As illustrated in FIG. 11 of the drawings, cover portion 66b includes a skirt portion 71 that is closely received within the cup housing 66a to form the construction shown in FIGS. 8 and 9.

As previously mentioned, an important feature of the apparatus 64 resides in the novel configuration of the sidewall that defines the tapered receiving chamber 74 that receives the container and the heat insulating, or protective sleeve "S" that surrounds the body of the container. More particularly, both the lower cup housing portion 66a and the cover 66b include oppositely disposed, downwardly curving portions 75a and 75b and 77a and 77b respectively that define oppositely disposed side openings 80a and 80b in the assembled apparatus 64 (see FIGS. 8 and 9) that permit the user to firm grasp the heat protective sleeve of the container as the container assemblage is being inserted into and removed from receiving chamber.

Figure 12:
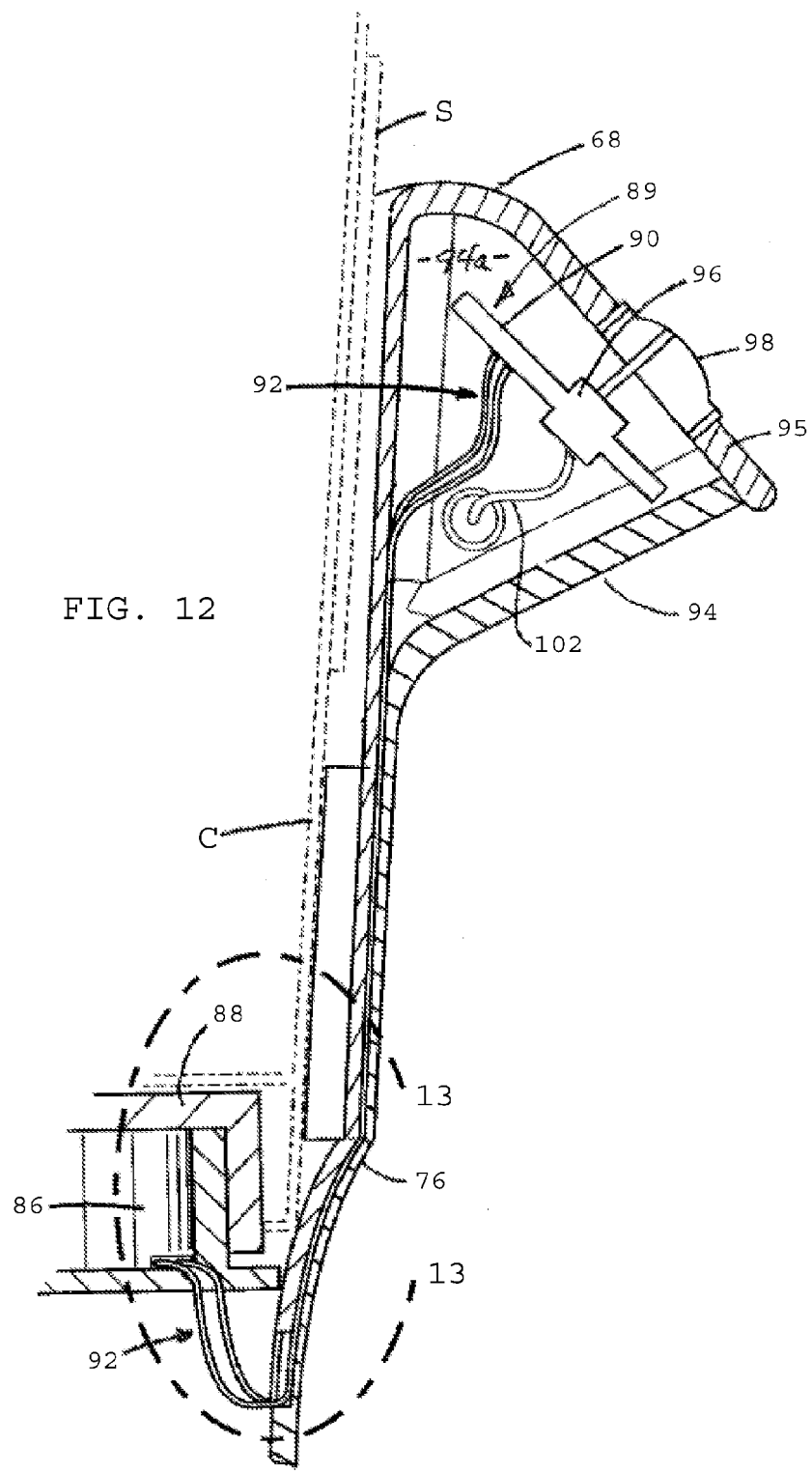
FIG. 12 is a greatly enlarged, cross-sectional view of the area designated in FIG. 10 as 12-12.

Also comprising an important feature of this latest form of the apparatus of the invention is a heater assembly 82 for heating liquids contained within the container "C" (see FIG. 11). Heater assembly 82, which is carried by the intermediate portion 83 of the lower cup housing portion 66a, is disposed in close proximity to tapered receiving chamber 74 (see FIG. 10). This important assembly here includes a silicone heater frame 84, an electric heater element 86 that is mounted within the heater frame and an aluminum heater cover 88 for covering the electric heater element and for supporting the container containing the liquid to be heated. While several types of heaters can be used in connection with the apparatus of the invention, heater assembly 82 here comprises a readily commercially available positive temperature coefficient ceramic heating element. Heating element 86 is available from several sources, including DBK USA, Inc. of Spartanberg, S.C. Forming another important feature of the apparatus of the invention is a controller assembly 89 that includes a conventional circuit board 90 that comprises an electrical circuit operably associated with the heater assembly 82 for energizing the electric heater 86 of the heater assembly. Circuit board 90, which is of the construction well understood by those skilled in the art, is interconnected with the electric heater 86 in a conventional manner by means of a pair of connector wires 92 (FIG. 12). In addition to energizing the electric heater, controller assembly 89 functions to maintain the heater cover 88 of the heater assembly at a selected elevated temperature.

As in the earlier described embodiment of the invention, the upper portion 68 of the cup housing includes a protuberance 94 that defines a chamber 94a within which the circuit board 90 of the controller assembly is mounted. Referring to FIGS. 11 and 12 of the drawings, when the cover portion 66b is mated with the cup housing 66a to form the liquid heating apparatus 64, the faceplate portion 95 of the cover portion overlaps and closes chamber 94a. Circuit board 90 includes a conventional switch 96 and is operated by an illuminated switch button 98 that is operably associated with switch 96 and is carried by a faceplate portion 95.

Figures 13A, 13B:
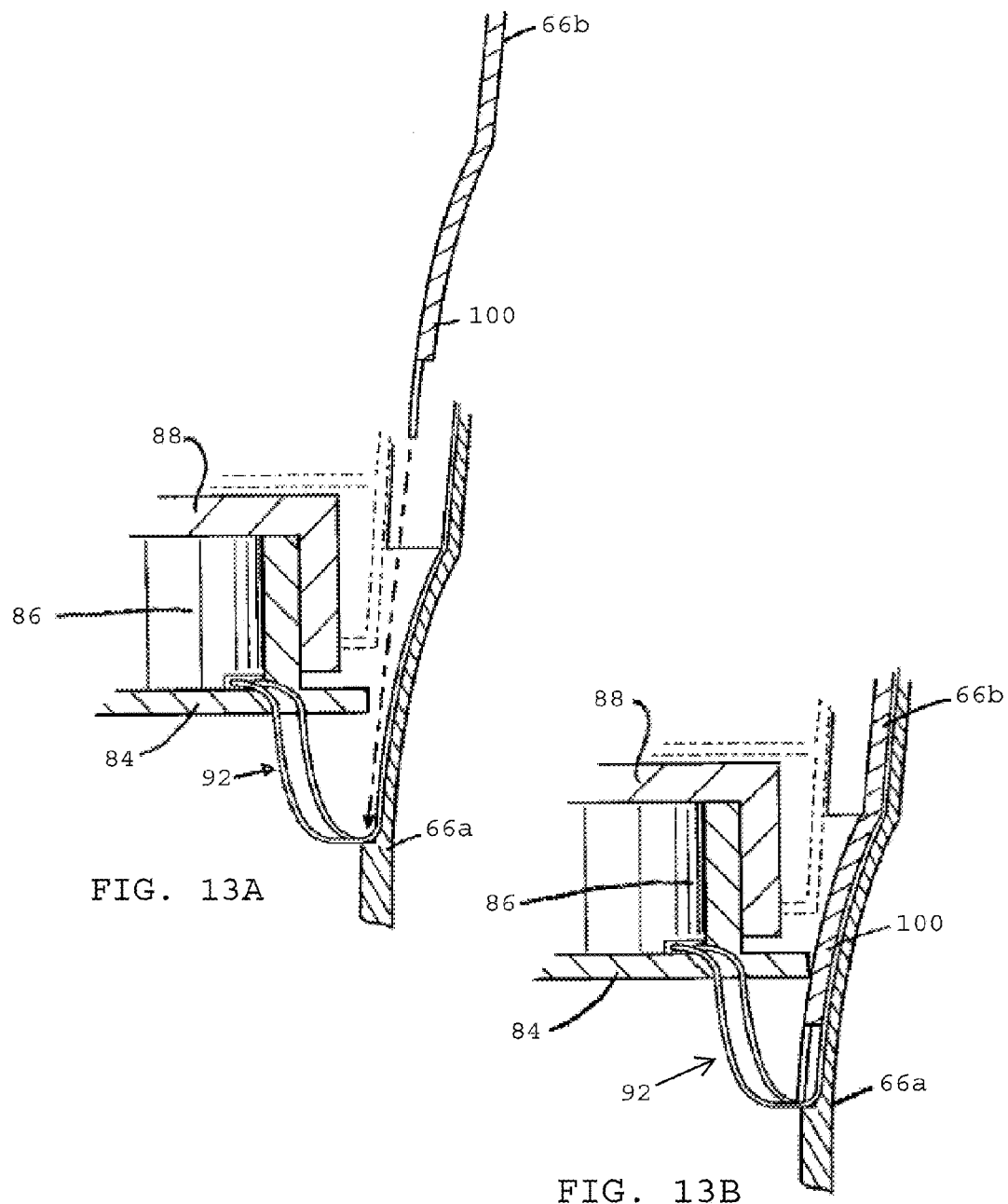
FIG. 13A is an exploded, fragmentary cross-sectional view similar to FIG. 12 showing in greater detail the mating of the control box cover with the cup housing.
FIG. 13B is a fragmentary cross-sectional view similar to FIG. 13A showing the control box cover mated with the cup housing in a manner to secure the electrical wires of the electrical circuit of the apparatus that lead to the heating element.

Referring to FIG. 11, cover portion 66b of the apparatus includes a downwardly extending tongue 100 (FIG. 11) that functions to hold the wires 92 in position. More particularly, as illustrated in FIGS. 13A and 13B, when the cover portion 66b of the apparatus is mated with the cup housing portion 66a, tongue 100 moves from the position shown in FIG. 13A to the mating position shown in FIG. 13B where it securely clamps the wires 92 into engagement with the inner surface of the cup housing wall.

As before, the portable liquid warmer or coffee cup warmer of the invention is designed to operate from a 12 VDC source, such as a cigarette lighter, or from a 120 VAC to 12 VDC adapter. For this purpose, the electrical circuit of the controller assembly includes a power cord connector 102 for connecting the electrical circuit to the twelve-volt power source (FIG. 11).

In using the apparatus of the invention, the user first inserts the container "C" containing the consumable liquid, such as a tapered paper cup, into the tapered receiving chamber 24. In this regard, as previously mentioned, the tapered receiving chamber 24 accepts all standard cup sizes and performs equally well with various other cup sizes. With the device connected to a suitable 12 VDC or 120 VAC power source, the control button 48 is pushed to activate the device. This will cause the electric heater to heat to the low temperature of about 125 degrees Fahrenheit and will cause LED 50 to illuminate indicating that the low temperature setting has been selected.

The design has been improved by removing a portion of both side walls of the unit and tapering the top. This allows the user to easily insert and remove the cup with a sleeve easily without having to hold the unit or having the cup or sleeve hang up on the warmer. By removing the sides in the manner shown in the enclosures, together with the tapered top rim, the user can grab the sleeve and cup at a low enough position and easily remove. This eliminates any fumbling around in retrieving the cup with sleeve, which is important when the user is driving. This unit utilizes the heat wrap design to heat the liquid, which surrounds the cup, and with these changes the wrap can be die cut or molded to fit the new shape. In addition, despite having less heat wrap to make contact with the cup, the heating performance is still sufficient for our application.

A second pushing of the control button 48 will cause the electric heater to heat to the medium temperature of about 140 degrees Fahrenheit and will cause LED 52 to illuminate indicating that the medium temperature setting has been selected.

Another object of the invention is to provide an alternate form of the apparatus of the invention as described in the preceding paragraph that is specially designed to permit the apparatus to be easily used with a disposable paper cup about which a heat insulating sleeve has been placed. More particularly, in the design of the alternate form of the apparatus of the invention, a portion of both of the side walls of the unit has been removed to permit the disposable paper cup along with a heat insulating sleeve to be easily inserted into and removed from the tapered receiving chamber of the unit.

Figure 14:
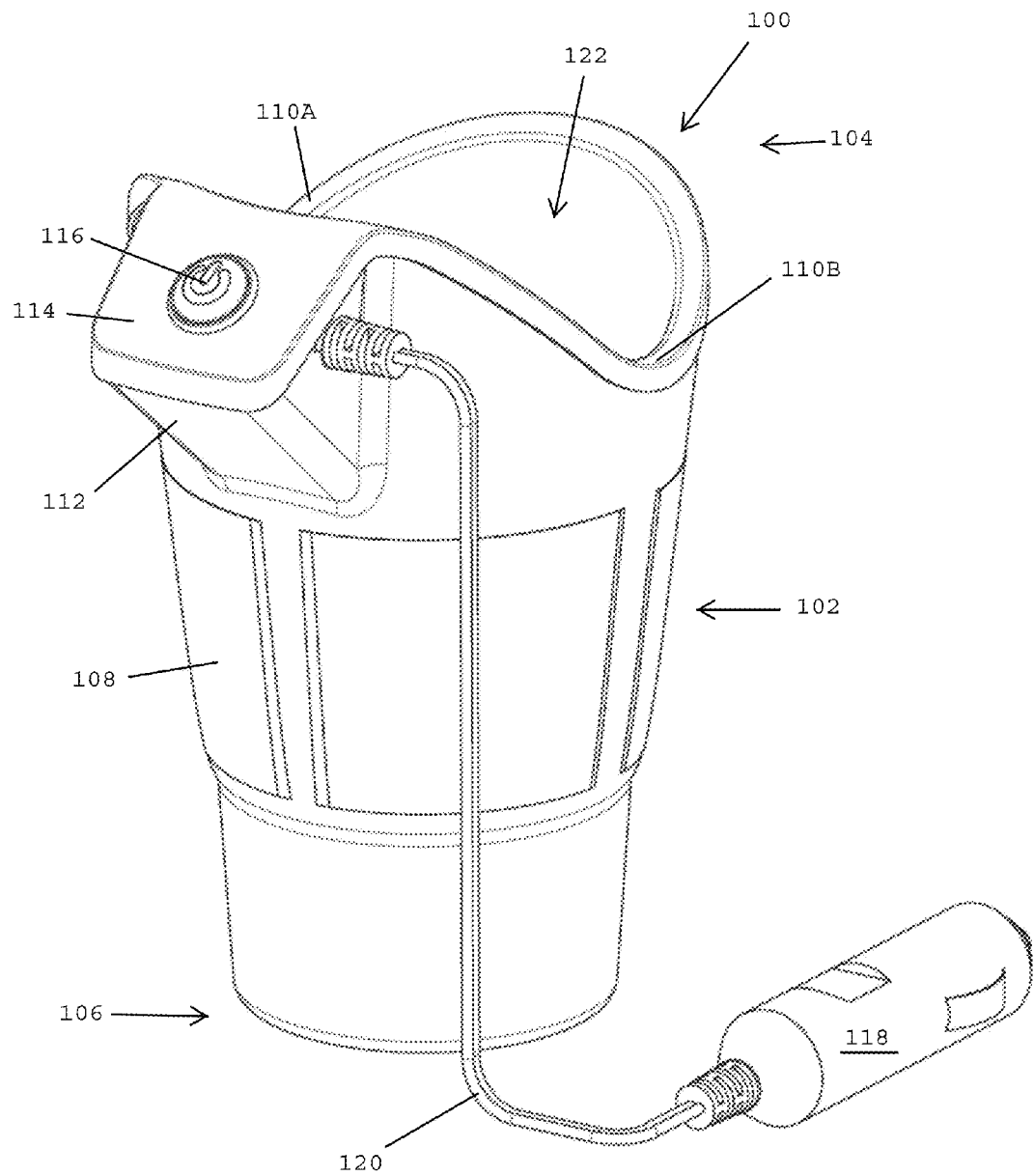
FIG. 14 shows a perspective view of an apparatus for heating hot beverage containers, in accordance with one embodiment of the present invention.
Figure 15:
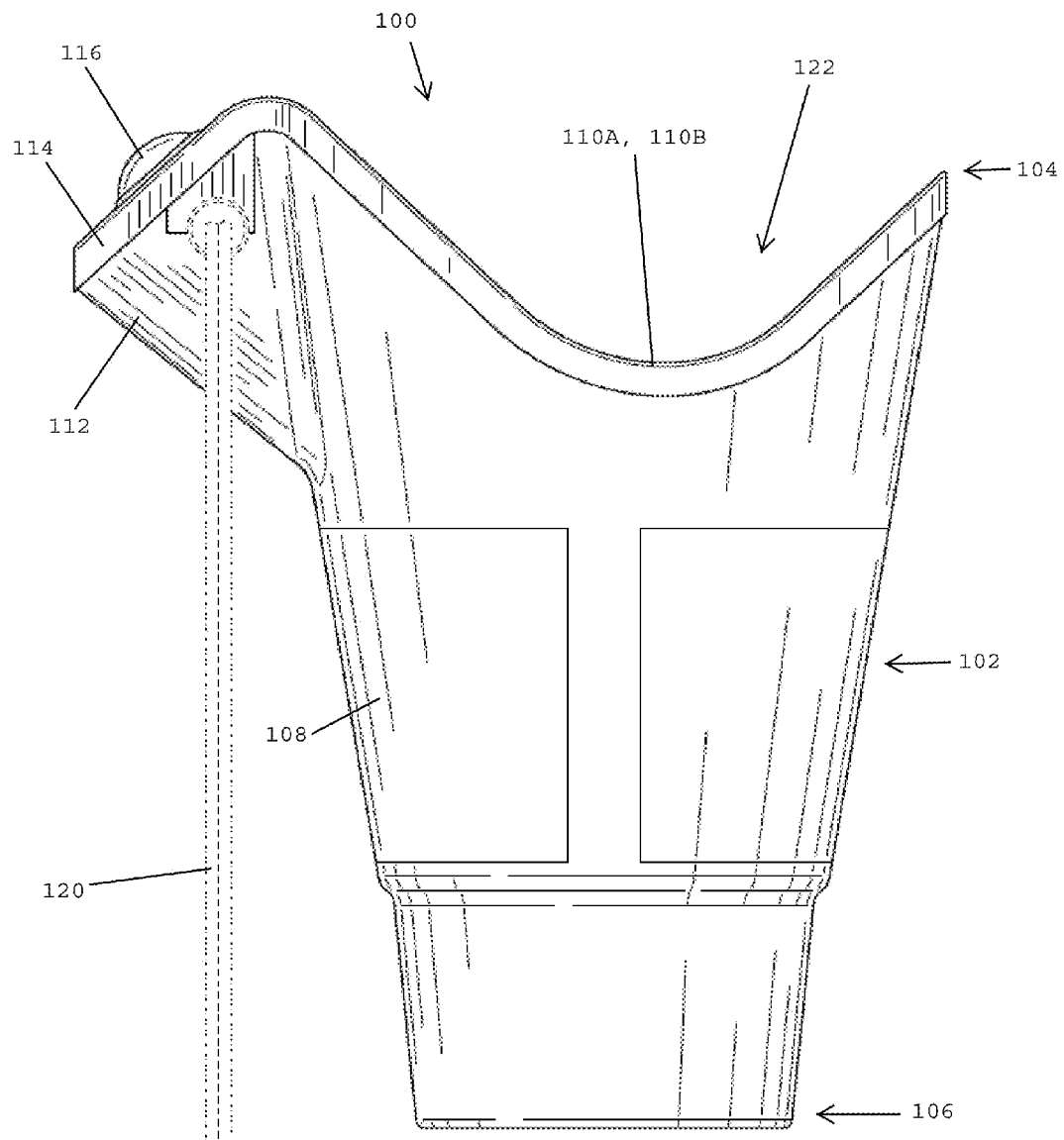
FIG. 15 shows a right side view of the apparatus shown in FIG. 14.

Referring to FIGS. 14 and 15, in one embodiment, an apparatus 100 for heating liquids held in hot beverage containers preferably includes a housing 102 having an upper end 104, a lower end 106, and a sidewall 108 that extends between the upper and lower ends of the housing. In one embodiment, the sidewall 108 tapers inwardly between the upper end 104 and the lower end 106 of the housing 102. The sidewall may have a curved outer surface. In one embodiment, the upper edge of the sidewall 108 has oppositely disposed, downwardly curving sections 110A, 110B that define oppositely disposed openings at the upper end 104 of the housing 102. The oppositely disposed openings enable a container having an insulting sleeve to be easily inserted into and removed from the housing. The cut-down area of the oppositely disposed openings desirably enables the insulating sleeve to be grasped because the upper end of the insulating sleeve projects above the oppositely disposed openings.

In one embodiment, the apparatus 100 preferably includes a protuberance 112 that projects outwardly at the upper end 104 of the housing 102. The protuberance desirably contains electronic components for controlling operation of the apparatus including the heater assembly disclosed herein. The upper end of the housing 102 preferably includes a cover 114 that overlies the protuberance 112. The cover 114 may have a sloping surface. An ON/OFF switch 116 is desirably accessible at the cover. The ON/OFF switch may be illuminated. In one embodiment, the apparatus is turned on by depressing the ON/OFF switch, and is turned off by pressing the ON/OFF switch a second time. The ON/OFF switch is desirably illuminated when the apparatus is turned on and is darkened (not illuminated) when the apparatus is turned off or unplugged.

In one embodiment, the apparatus 100 preferably includes a plug 118 and a flexible power cord 120 for providing power to the electronic components for activating and controlling operation of the heater assembly.

In one embodiment, the apparatus 100 preferably includes the sidewall 108 that extends between the upper and lower ends of the housing 102. The sidewall 108 defines a hot beverage container opening 122 located at the upper end of the housing. In one embodiment, the housing 102 has a bottom wall 124 (FIG. 17) that closes the lower end of the housing.

Figure 16:
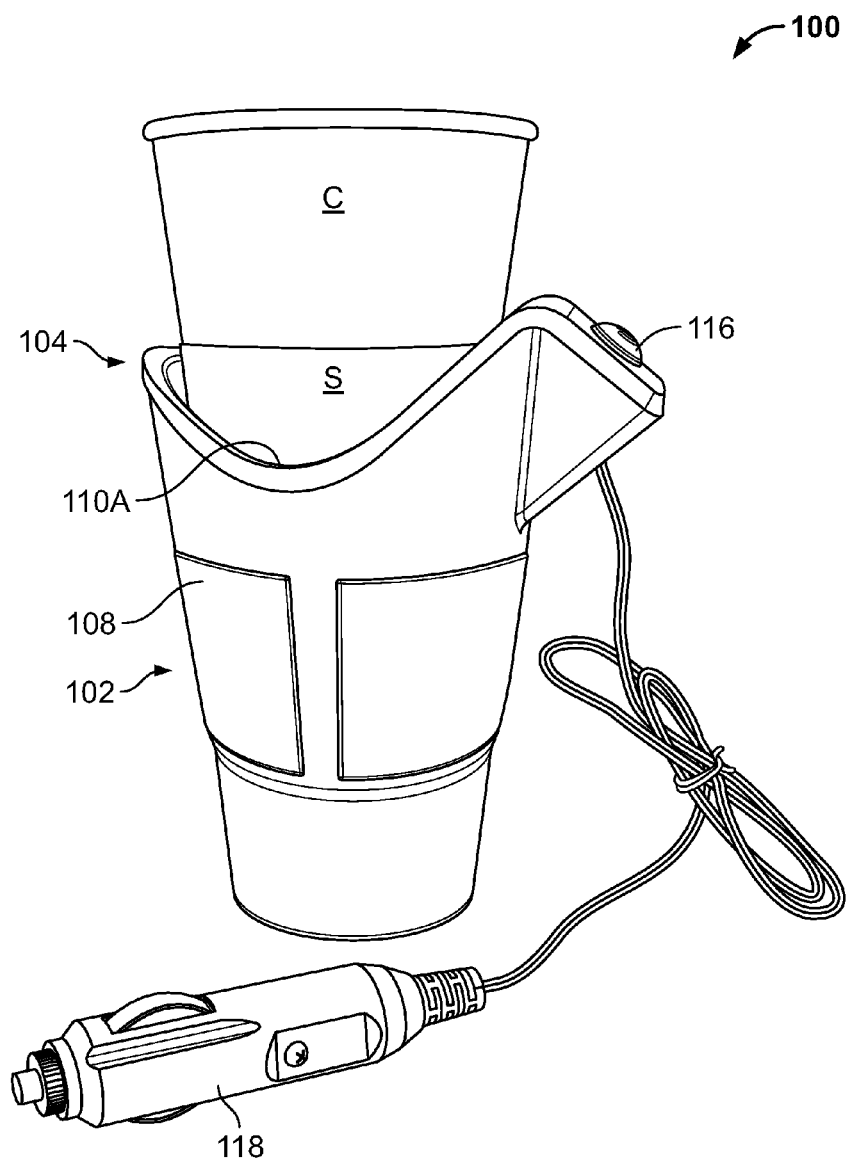
FIG. 16 shows a left side view of the apparatus shown in FIG. 15 with a hot beverage container and an insulating sleeve inserted into the apparatus.

Referring to FIG. 16, in one embodiment, the housing 102 is not designed to hold a liquid. Rather, the housing 102 is designed to hold a hot beverage container C, which, in turn, holds a liquid. The hot beverage container C is preferably made of paper or cellulose material. An insulating sleeve S, such as a paper insulating sleeve, surrounds the sidewall of the hot beverage container C. Due to the presence of the insulating sleeve S, attempting to use conventional heating devices to heat the container C through the sidewall of the container will not be effective. Thus, as will be described in more detail herein, the apparatus disclosed herein provides a heater assembly that is in direct contact with the bottom wall of the container C for heating the liquid through the bottom wall of the container and not the sidewalls of the container.

When using prior art cup holder heating devices, the presence of the insulating sleeve S on the container C makes it difficult to insert and remove the container C from the cup holder device. In order to eliminate this problem, the upper edge of the sidewall 108 has the oppositely disposed, downwardly curving sections 110A and 1108 (FIG. 14) that define oppositely disposed openings at the upper end 104 of the housing 102. The oppositely disposed openings enable the insulating sleeve S to be grasped for removing and inserting the container C into the housing 102.

Figure 17:
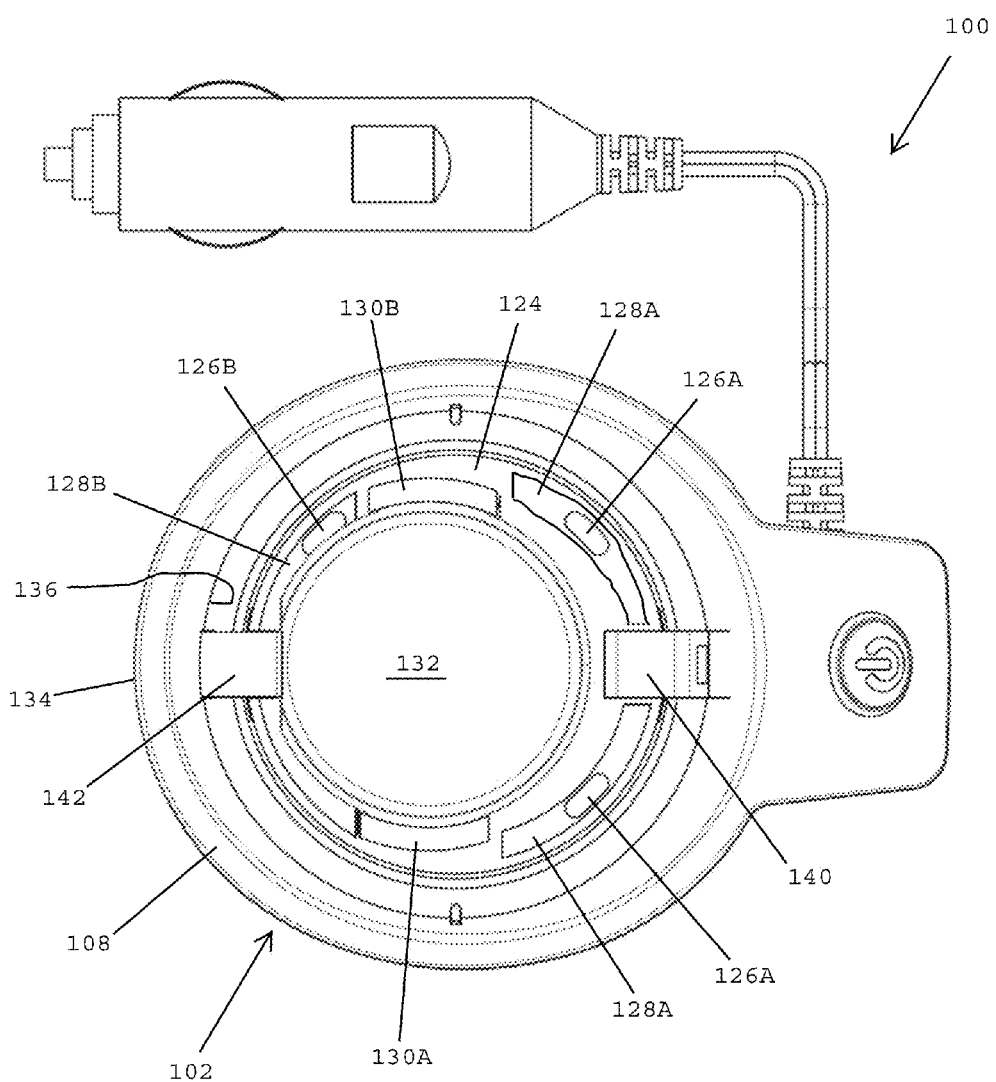
FIG. 17 shows a top plan view of the apparatus shown in FIG. 14.

Referring to FIG. 17, in one embodiment, the bottom wall 124 of the housing 102 has drainage holes 126A-126C formed therein that enable any liquid spilled inside the housing to drain through the bottom wall of the housing. The bottom wall 124 desirably has depressions 128A-128C formed therein, which bound the respective drainage holes 126A-126C. During use of the apparatus 100, if liquid is accidently spilled into the bottom of the housing 102, the liquid is first directed into the depressions 128A-128C, and then through the drainage holes 126A-126C for draining the liquid from the housing 102.

In one embodiment, the housing 102 preferably has a pair of alignment flanges 130A, 130B that project upwardly from the bottom wall 124. The alignment flanges 130A, 130B preferably oppose one another at the lower end of the housing and are used for properly centering a heater assembly 132 over the bottom wall 124 of the housing 102. As shown in FIG. 17, when the heater assembly 132 is positioned at the bottom of the housing 102, the depressions 128A-128C and the drainage holes 126A-126C surround the outer perimeter of the heater assembly 132.

In one embodiment, the sidewall 108 of the housing 102 has a curved outer surface 134 and a curved inner surface 136. The inner surface 136 desirably tapers inwardly between the upper and lower ends of the housing. The heater assembly 132 is located inside the housing, at the lower end of the housing, where it is supported by the bottom wall 124 of the housing and surrounded by and spaced from the inner surface 136 of the sidewall 108.

In one embodiment, the apparatus 100 preferably includes a switch 140 that is exposed at the inner surface 136 of the sidewall 108. The switch 140 may be mounted on the inner surface 136 of the sidewall. The switch is desirably located near the lower end of the housing so that it engages the section of the sidewall located below the insulating sleeve. In one embodiment, different size switches (e.g., switches having different lengths) may be used in response to the size of the container that is used. In one embodiment, the apparatus 100 preferably has a spring 142 that is mounted inside the housing and that opposes the switch 140. When a hot beverage container is inserted into the housing, the spring 142 preferably engages a first side of the container for urging an opposite, second side of the container to engage the switch 140 for activating the heater assembly 132.

Figure 18:
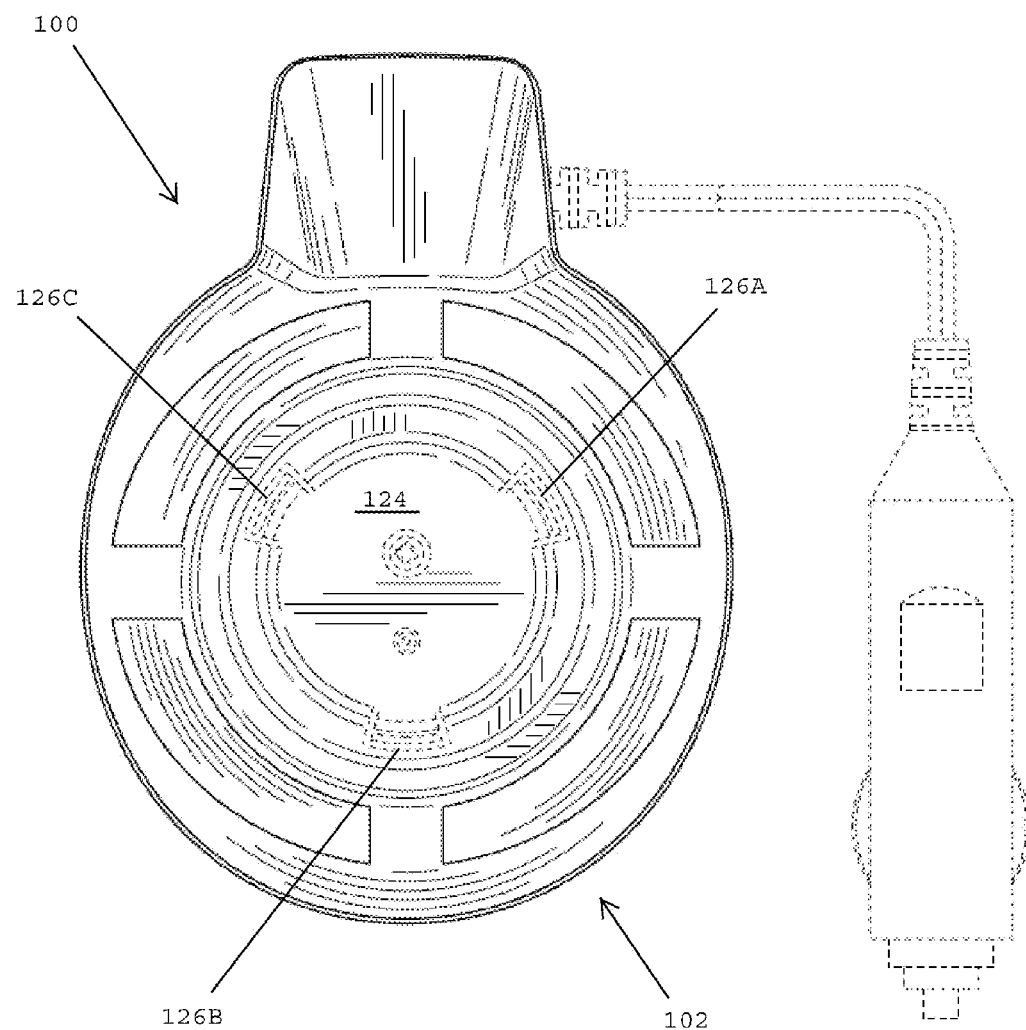
FIG. 18 shows a bottom view of the apparatus shown in FIG. 14.

FIG. 18 shows the bottom of the apparatus 100 including the bottom wall 124 of the housing 102. As noted above, the bottom wall 124 has spaced drainage holes 126A-126C formed therein for enabling liquid accidently spilled inside the housing to be drained through the bottom wall 124 of the housing.

Figure 19:
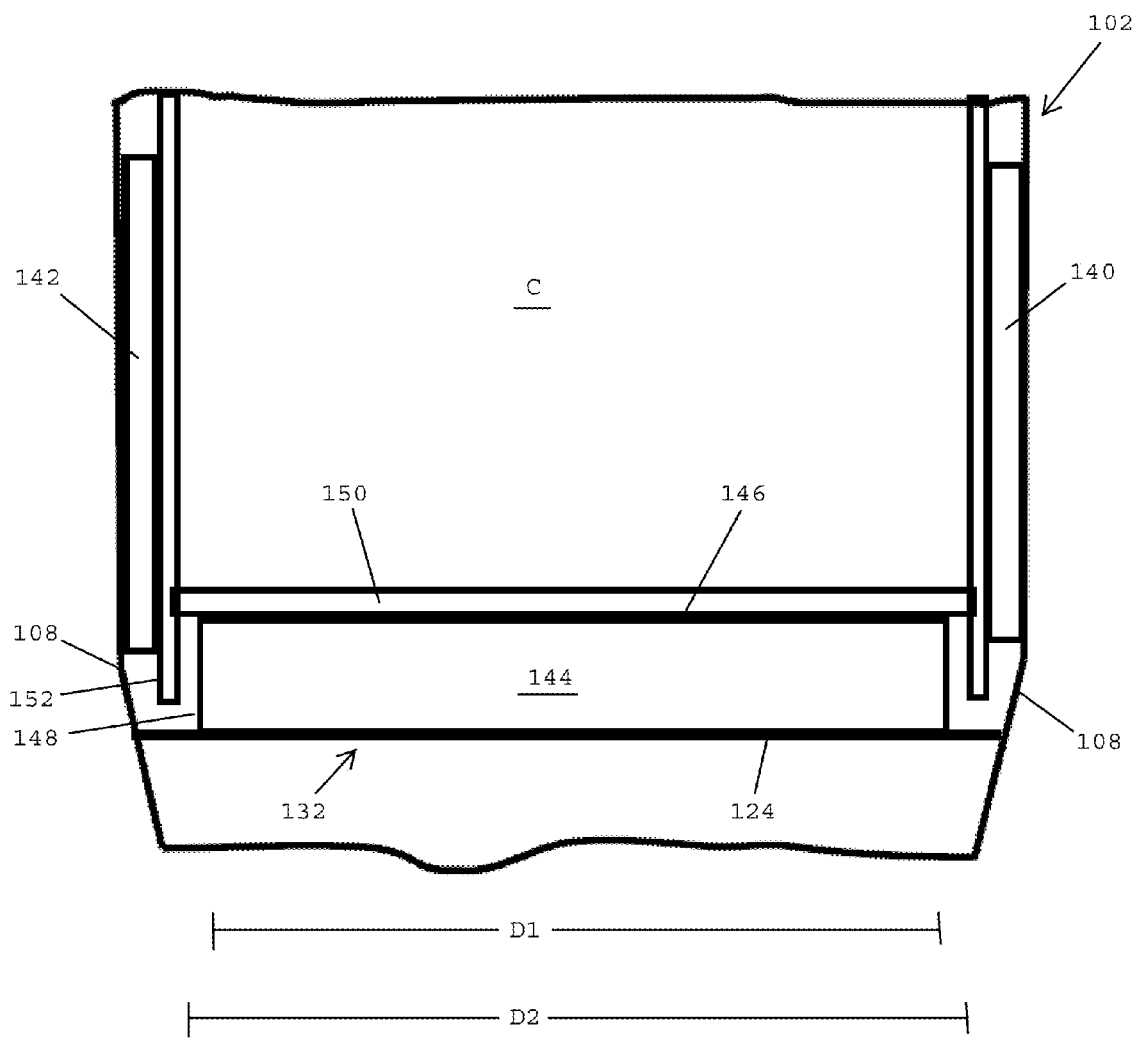
FIG. 19 shows a cross-sectional view of an apparatus for heating hot beverage containers, in accordance with one embodiment of the present invention.

Referring to FIG. 19, in one embodiment, the heater assembly 132 is supported by the bottom wall 124 of the housing 102. The heater assembly 132 preferably includes a heating element mounted in the heater frame and a heater cover 144 over the heater element, the heater cover having a top surface 146 and an outer perimeter 148 with an outer diameter D1. In one embodiment, the top surface 146 of the heater cover 144 is flat and extends in a horizontal direction. When the hot beverage container C with the insulating sleeve is inserted into the housing, the bottom wall 150 of the container C contacts the top surface 146 of the heater cover so that the bottom wall 150 is in thermal communication with the heater assembly 132. The bottom rim 152 of the container C has a diameter D2 that is larger than D1 so that the bottom rim surrounds the outer perimeter 148 of the heater cover 144. The bottom rim 152 is desirably disposed between the sidewall 108 of the housing 102 and the outer perimeter of the heater cover 144.

The spring 142 mounted on the sidewall 108 of the housing engages a first portion of the sidewall 154 of the container, which, in turn, urges an opposite, second portion of the sidewall of the container C to engage the switch 140. The switch is desirably in communication with the controller and the electronic components of the circuit. In one embodiment, when the switch is depressed, thereby indicating the presence of a container C within the housing 102, the heater assembly is activated for heating the liquid in the container C through the bottom wall 150 of the container C.

Referring to FIG. 16, in one embodiment, in order to use the apparatus 100 for heating a liquid held within the hot beverage container C, the plug 118 is inserted into a power outlet and the ON/OFF switch 116 is depressed. The ON/OFF switch will desirably illuminate when pressed a first time to indicate that power for the apparatus has been turned on.

Referring to FIGS. 16, 17, and 19, the heater assembly 132 is activated only when the container C is inserted into the housing so that the sidewall of the container engages the switch 140. Once the switch 142 is depressed by the sidewall of the container C, the heater assembly 132 is activated for heating the liquid through the bottom wall of the container C.

In one embodiment, if the ON/OFF switch is in the off position (e.g., not illuminated), depressing the switch 140 will not activate the heater assembly 132. Rather, the heater assembly will only activate if the ON/OFF switch is in the on position and the switch 140 is depressed by the sidewall of the container C.

In one embodiment, the heater assembly is set to heat the liquid to a single temperature and the heating temperature is not adjustable. In another embodiment, a user may modify the heating temperature by communicating with the controller.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. An apparatus for heating hot beverage containers comprising:
   a housing having an upper end, a lower end, and a sidewall extending between said upper and lower ends of said housing, wherein an upper end of said sidewall has oppositely disposed, downwardly curving portions that define oppositely disposed openings at said upper end of said housing;
   a heater assembly disposed inside said housing and located at said lower end of said housing, wherein said sidewall of said housing surrounds said heater assembly;
   a controller comprising an electrical circuit in communication with said heater assembly;
   a switch located on an inner surface of said sidewall of said housing and being in communication with said controller for activating said heater assembly;
   a spring located on said inner surface of said sidewall, said spring opposing said switch inside said housing.

2. The apparatus as claimed in claim 1, further comprising:
   a hot beverage container having a bottom wall defining a closed end of said container and a sidewall extending between upper and lower ends of said hot beverage container, a lower end of said sidewall defining a bottom rim of said hot beverage container that extends below said bottom wall of said hot beverage container; and
   an insulating sleeve overlying said sidewall of said hot beverage container.

3. The apparatus as claimed in claim 2, wherein said hot beverage container is inserted into said housing, said spring engaging a first side of said hot beverage container for urging an opposite second side of said hot beverage container into engagement with said switch on said sidewall of said housing for activating said heater assembly.

4. The apparatus as claimed in claim 3, wherein said heater assembly comprises:
   an electric heater element in communication with said controller;
   a heater cover overlying said electric heater element, said heater cover having a top surface facing toward said upper end of said housing, wherein when said hot beverage container is inserted into said housing, said bottom wall of said hot beverage container directly engages said top surface of said heater cover for heating liquid contained within said hot beverage container.

5. The apparatus as claimed in claim 4, wherein said bottom wall of said hot beverage container directly engages said top surface of said heater cover, and said bottom rim of said hot beverage container surrounds an outer perimeter of said heater cover.

6. The apparatus as claimed in claim 5, wherein said bottom wall of said hot beverage container directly engages said top surface of said heater cover, and said bottom rim of said hot beverage container extends between said outer perimeter of said heater cover and said sidewall of said housing.

7. The apparatus as claimed in claim 2, wherein said hot beverage container comprises paper.

8. The apparatus as claimed in claim 7, wherein said insulating sleeve comprises paper.

9. The apparatus as claimed in claim 3, wherein said insulating sleeve extends above said oppositely disposed openings in said sidewall for being accessible through said oppositely disposed openings.

10. The apparatus as claimed in claim 1, wherein said upper end of said housing includes a protuberance defining a chamber, and wherein said electrical circuit of said controller is disposed within said chamber.

11. The apparatus as claimed in claim 4, wherein said heater assembly further comprises a heater frame for supporting said electric heater and said heater cover covering said electric heater.

12. The apparatus as claimed in claim 1, further comprising an ON/OFF switch accessible outside said housing, wherein said ON/OFF switch is in communication with said electrical circuit.

13. The apparatus as claimed in claim 12, wherein said ON/OFF switch is illuminated.

14. The apparatus as claimed in claim 1, wherein said housing comprises a bottom wall having at least one drainage hole adapted to drain liquid from said lower end of said housing.

15. An apparatus for heating a hot beverage container holding liquid comprising:
a housing having an upper end, a lower end, and a sidewall extending between said upper and lower ends of said housing, an upper end of said sidewall having oppositely disposed, downwardly curving portions that define oppositely disposed openings at said upper end of said housing, wherein said housing includes a bottom wall having at least one drainage hole adapted to drain liquid from said lower end of said housing;
a heater assembly located at said lower end of said housing, wherein said sidewall of said housing surrounds said heater assembly;
a controller comprising an electrical circuit in communication with said heater assembly for energizing said heater assembly;
a switch located on an inner surface of said sidewall of said housing and being in communication with said controller;
a hot beverage container having a bottom wall and a sidewall extending upwardly from said bottom wall, wherein said sidewall of said hot beverage container extends below said bottom wall of said hot beverage container to define a bottom rim of said hot beverage container; and
an insulating sleeve overlying said sidewall of said hot beverage container;
said hot beverage container being disposed inside said housing with said sidewall of said hot beverage container engaging said switch for activating said heat assembly, and said bottom wall of said hot beverage container being in thermal communication with said heater assembly;
said apparatus further comprising a spring element disposed on said sidewall of said housing, said spring element opposing said switch and engaging a first side of said hot beverage container for urging a second side of said hot beverage container against said switch.

16. The apparatus as claimed in claim 15, wherein said heater assembly comprises:
a heater frame disposed inside said housing and overlying a bottom wall of said housing;
an electric heater element supported by said heater frame and being in communication with said controller;
a heater cover overlying said electric heater element, said heater cover having a top surface facing toward said upper end of said housing, wherein said bottom wall of said hot beverage container directly engages said top surface of said heater cover for heating liquid held by said hot beverage container.

17. The apparatus as claimed in claim 16, wherein said bottom rim of said hot beverage container surrounds an outer perimeter of said heater cover.

18. The apparatus as claimed in claim 17, wherein said bottom rim of said hot beverage container extends between said outer perimeter of said heater cover and said sidewall of said housing.

19. The apparatus as claimed in claim 15, wherein said insulating sleeve extends above said oppositely disposed openings at said upper end of said housing for being accessible through said oppositely disposed openings.

20. An apparatus for heating hot beverage containers comprising:
a housing having an upper end, a lower end, and a sidewall extending between said upper and lower ends of said housing, wherein said housing includes a bottom wall having at least one drainage hole adapted to drain liquid from said lower end of said housing;
a heater assembly disposed inside said housing and located at said lower end of said housing, wherein said sidewall of said housing surrounds said heater assembly;
a controller comprising an electrical circuit in communication with said heater assembly;
a switch located on an inner surface of said sidewall of said housing and being in communication with said controller for activating said heater assembly;
a spring located on said inner surface of said sidewall at a location that opposes said switch.

21. The apparatus as claimed in claim 20, wherein said housing comprises a two-part housing having a lower cup housing portion and an upper cover portion that are assembled together, wherein both said lower cup housing portion and said upper cover portion include oppositely disposed, downwardly curving portions, respectively, that define oppositely disposed side openings at said upper end of said sidewall of said housing.

* * * * *